United States Patent
van Zijderveld et al.

(10) Patent No.: US 6,193,056 B1
(45) Date of Patent: Feb. 27, 2001

(54) CONVEYOR MAT AND SYSTEM FOR CONVEYING PRODUCTS

(75) Inventors: G. J. van Zijderveld, 's-Gravenzande; F. J. M. van Esch, Breda, both of (NL)

(73) Assignee: MCC Nederland, B.V. (NL)

( * ) Notice: Subject to any disclaimer, the term of this patent is extended or adjusted under 35 U.S.C. 154(b) by 0 days.

(21) Appl. No.: 09/233,866

(22) Filed: Jan. 19, 1999

(30) Foreign Application Priority Data

Jan. 19, 1998 (NL) .................................................. 1008069

(51) Int. Cl.$^7$ .................................................. B65G 17/06
(52) U.S. Cl. .............................................. 198/853; 198/325
(58) Field of Search ...................................... 198/850, 851, 198/853, 325, 635

(56) References Cited

U.S. PATENT DOCUMENTS

| | | | |
|---|---|---|---|
| 2,911,091 | * 11/1959 | Imse | 198/853 |
| 3,628,834 | * 12/1971 | Anderson | 198/853 |
| 3,774,752 | * 11/1973 | Harvey | 198/853 |
| 4,051,949 | 10/1977 | Lapeyre . | |
| 4,438,838 | * 3/1984 | Hodlewsky et al. | 198/853 |
| 5,613,597 | * 3/1997 | Palmaer et al. | 198/853 |

FOREIGN PATENT DOCUMENTS

| | | | |
|---|---|---|---|
| 92 12 554 | 2/1993 | (DE) . | |
| 0 482 531 A1 | * 4/1992 | (EP) | 198/853 |
| 2 138 376 | 10/1984 | (GB) . | |

* cited by examiner

Primary Examiner—Christopher P. Ellis
Assistant Examiner—Mark A. Deuble
(74) Attorney, Agent, or Firm—Varnum, Riddering, Schmidt & Howlett LLP

(57) ABSTRACT

A conveyor mat for conveying products in a conveying direction between at least two divert wheels. The conveyor mat comprises a number of plastic modules succeeding each other in conveying direction and extending transversely to the conveying direction, which modules, in conveying direction, each have their front and rear sides provided with hinge loops. The hinge loops of modules that succeed each other in conveying direction cooperate and are coupled by means of hinge pins extending transversely to the conveying direction. The top faces of the modules together constitute a conveying face. The modules are each provided with through openings extending substantially transversely to the conveying face, and with a substantially flat top face in which at least one groove, extending in conveying direction, is provided. The modules are coupled so that the conveying face comprises a substantially straight slot extending in conveying direction over the length of the conveyor mat. The at least one groove is preferably provided with two sidewalls connected via a base.

23 Claims, 10 Drawing Sheets

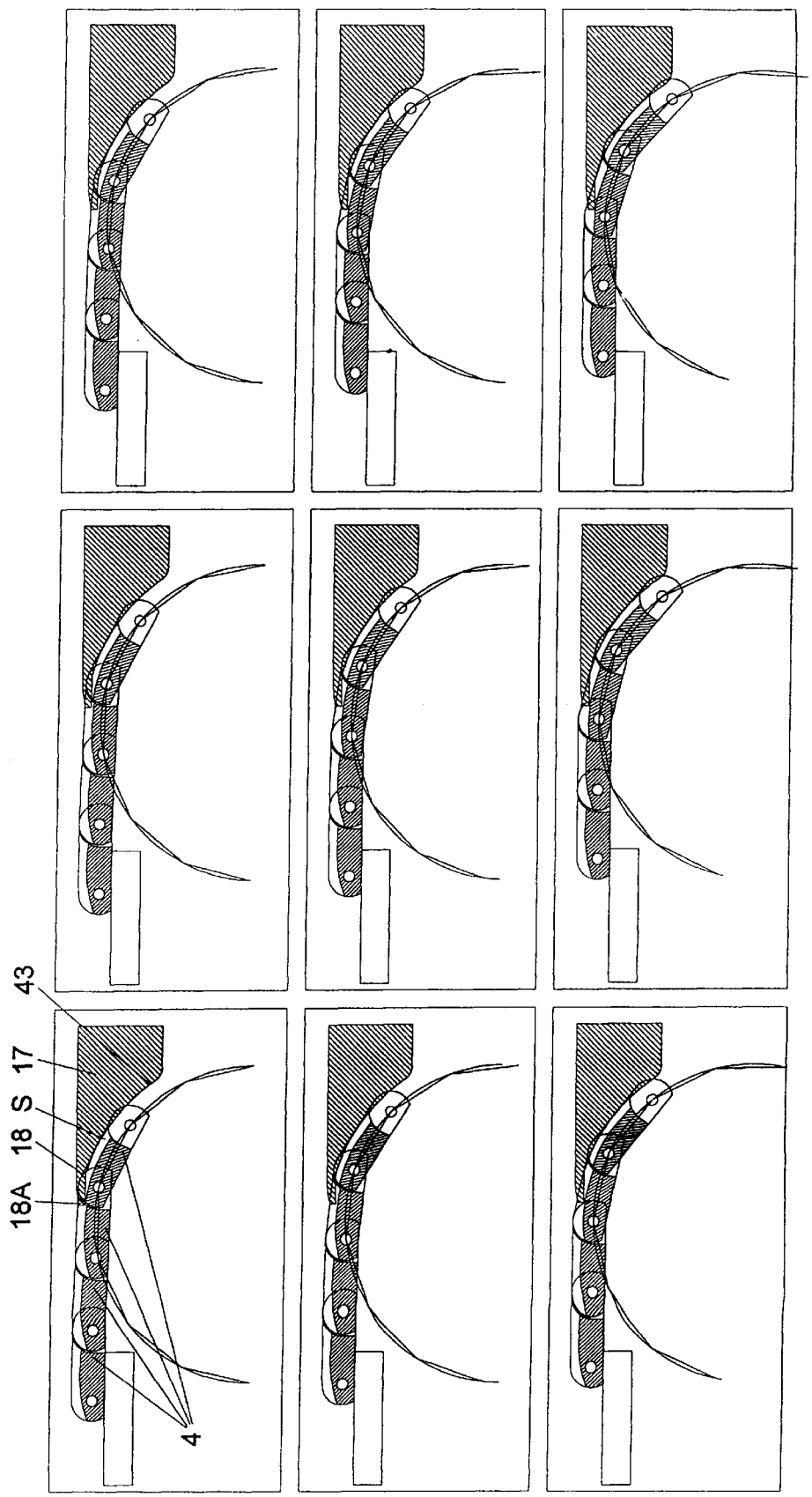

CONVEYOR MAT AND SYSTEM FOR CONVEYING PRODUCTS

BACKGROUND OF THE INVENTION

1. Field of the Invention

The invention relates to a conveyor mat for conveying products in a conveying direction between at least two divert wheels, comprising a number of plastic modules succeeding each other in conveying direction and extending transversely to the conveying direction, which modules, viewed in conveying direction, each have their front and rear sides provided with hinge loops, the hinge loops of modules that succeed each other in conveying direction cooperating and being coupled by means of hinge pins extending transversely to the conveying direction, which modules are each provided with through openings extending substantially transversely to the conveying face and of which modules the top faces together constitute a conveying face.

The invention also relates to a conveying system, comprising an endless conveyor mat extending between at least two divert wheels, for conveying products between the divert wheels in a conveying direction, which conveyor mat comprises a number of plastic modules succeeding each other in conveying direction and extending transversely to the conveying direction, which modules, viewed in conveying direction, each comprise hinge loops at their front and rear sides, the hinge loops of modules that succeed each other in conveying direction cooperating and being coupled by means of hinge pins extending transversely to the conveying direction, of which modules the top faces together constitute a conveying face and which modules are each provided with through openings extending substantially transversely to the conveying face, and which conveying system further comprises a slide-over device for transferring, adjacent a divert wheel from or towards the conveying face, products conveyed by the conveyor mat towards or from said divert wheel.

2. Description of Related Art

Such conveyor mats and conveying systems are known and are used for conveying all kinds of products in a large number of different environments. A particularly exacting application of such conveyor mat and such conveying system concerns the transport of products through a pasteurizer for pasteurizing the products.

During pasteurization, products, in particular beverages, after having been introduced into a package, are heated for some time so as to prolong the storage life of the products. To that end, the sealed packages containing the product are placed on a conveying track and passed through an encasing forming a long, watertight tunnel. The conveying track often has a length of 25–35 m and a width of 3–5 m. The conveying track passes the products within the tunnel along a number of zones where warm water having per zone a different temperature is sprayed onto the packages, for instance 20-40-60-80-60-40° C. Such conveying track conveys the products at a speed of about 0.5–1 m/sec and has a capacity of about 30–70,000 packages per hour. In the temperature zones, about 25 m³ water per hour is sprayed onto the products per m² track surface area. In order to use the water more efficiently, the conveying track is preferably of a double-decked design. The packages conveyed through the pasteurizer by means of the conveying track are usually pots or bottles manufactured from metal, plastic or glass.

In the known conveyors, as conveying track, endless conveyor mats are often used which are built up from a fabric of stainless steel wires. A drawback thereof is that such conveyor mats are expensive to purchase. Moreover, these conveyor mats are not of modular construction, as a consequence of which the repair of a damage in such conveyor mat is a time-consuming operation that has to be performed by a specialist.

Another type of conveying track used for conveying products through a pasteurizer is a walking beam, where the conveying track is formed by a number of juxtaposed even and uneven rows of beams succeeding each other in conveying direction, with the juxtaposed rows of beams overlapping each other in length. By means of crank-connecting rod mechanisms, the beams are reciprocated in such a manner that the products are in each case lifted by the even rows of beams and deposited on the row of uneven beams that follows in conveying direction, and so forth. Not only is such apparatus very expensive to purchase and maintain, also the chance of damage to the package and/or the product is substantial, because of the product each time being lifted and deposited within the pasteurizer.

For reasons of cost, attempts have been made to design the conveying track as an endless conveyor mat circulating in a conveying direction between a first divert wheel and a second divert wheel. Such a conveyor mat is known from U.S. Pat. No. 4,051,949. The conveyor mat is built up from a large number of interconnected plastic modules, each built up from a number of fins extending in parallel, side by side relationship in conveying direction. A number of these fins are provided with a raised rib. The top sides of these raised ribs together constitute a substantially ribbed conveying face built up from laterally staggered ribs which partially overlap in conveying direction. Adjacent the divert wheels, the products are transferred towards or from the conveying face by a slide-over device comprising a comb having a flat part carrying tooth-shaped projections. The teeth project between the raised ribs so that during discharging, the foremost products are transferred from the conveying face and pushed onto the flat part of the comb via the teeth by the following products, while via the second divert wheel, the modules continue their endless path. During the supply of products, the foremost products are pushed, at the location of the first divert wheel, from the flat part of the comb onto the conveying face via the teeth by following products.

A drawback of the known lamellar, plastic conveyor mat is that because of the high temperatures to which the conveyor mat is exposed in the pasteurizer, and because of the substantial pulling force exerted on the conveyor mat, this mat is insufficiently stretch and wear resistant.

Another drawback of the known plastic conveyor mat and of the known conveying system is that they are not suitable for conveying glass packages through a pasteurizer. As it is, during pasteurization, the pressure in the package increases. This may lead to breakage of about 1% of the glass packages as a consequence of weak spots in the glass and/or an unduly high filling degree of the package. In the known conveyor mat and in the known conveying system, the glass fragments of the broken packages get stuck in the ribbed conveying face, i.e. between the ribs and/or fins of successive modules, causing the modules to damage each other and/or the divert wheels. Moreover, large, flat fragments of glass fall through the spaces located between the fins of the modules and onto the inner side of the returning part of the conveyor mat, so that such fragments, when arriving at a divert wheel again, damage the modules and/or the divert wheel. The slide-over device gets damaged as well. In particular, the teeth of the comb break off or are bent by glass fragments stuck between the ribs and/or the fins, as a result of which they form an obstacle to the packages. Further, glass fragments may accumulate under the flat portion of the comb of the slide-over device, causing the comb to rise in the conveying plane and the teeth to form an obstacle to the products. Hence, in practice, in a pasteurizer for products packed in glass packages, plastic mats and/or such conveying systems are hardly used as conveying track. This is also the case when plastic conveyor mats and/or such conveying systems are used in other circumstances where high requirements are imposed on the temperature resistance, wear resistance and sturdiness.

SUMMARY OF THE INVENTION

The object of the invention is to provide a temperature resistant, wear resistant and sturdy conveyor mat and a temperature resistant, wear resistant and sturdy conveying system of the type mentioned in the opening paragraph, in particular suitable for conveying glass packages through a pasteurizer, which conveyor mat and which conveying system do not have the above-mentioned drawbacks. To that end, the conveyor mat according to the invention is characterized in that the modules each comprise a substantially flat top face in which at least one groove extending in conveying direction is provided, which at least one groove has two sidewalls connected via a base, and that successive modules cooperate in such a manner that the top faces constitute a substantially flat conveying face and that grooves together form at least one substantially straight slot that extends in conveying direction over the length of the conveyor mat in the conveying face and has substantially blending sidewalls.

Thus, it is inter alia provided that fewer fragments fall through the module or get stuck in the module, while adjacent the divert wheel, dirt and fragments can relatively easily, and with a considerably smaller chance of damage, be removed from the slot and discharged along the finger by means of a finger cooperating with the blending sidewalls of the slot. Via the through openings, smaller dirt, glass grit and water can be discharged through the module.

It is observed that in this context, 'substantially blending' should be understood to mean at least connecting with a slight stagger or discontinuities.

In another embodiment, the conveyor mat according to the invention is characterized in that each hinge loop is provided with maximally one groove. This inter alia enables the hinge loops to be of a firm design. Further, it is thus provided that when the mat travels around the divert wheel, the finger engages the foremost part of the module in conveying direction, adjacent the pivotal axis between the modules.

In yet another embodiment, the conveyor mat according to the invention is characterized in that transversely to the conveying direction, the at least one groove has a substantially rectangular section, preferably widening towards the top face. It is thus provided that the chance of fragments getting stuck in the groove is further reduced, while the cooperation of the finger with the groove is facilitated. In an advantageous embodiment, transversely to the conveying direction, the at least one groove has a trapezoidal section and/or a curved base.

In a next embodiment, the conveyor mat according to the invention is characterized in that the base of the at least one groove comprises flow-blocking means. It is thus provided that water does not move along the slot over the conveyor mat, which prevents the water from the different temperature zones of the pasteurizer from being mixed. In an advantageous embodiment, the flow-blocking means are constructed as a curvature which is convex towards the conveying face, enabling water to flow away via the groove along the front and rear of the module.

In yet another embodiment, the conveyor mat according to the invention is characterized in that the base of the at least one groove is curved in conveying direction, in such a manner that when the mat travels around a divert wheel, the bases of successive modules substantially blend with each other. It is thus provided that during this travel, the chance of damage to the fingers and/or the modules can be further reduced, while dirt and glass fragments can easily be removed from the grooves by the fingers.

In a further embodiment, the conveyor mat according to the invention is characterized in that the base of the at least one groove is curved with a radius such that when the conveyor mat travels around a divert wheel, the slot at that location forms a circular arc with the axis of the divert wheel as center. It is thus provided that the finger and/or an associated support body at the location of a divert wheel can rest against the slot and can shut off the slot against the ingress of glass fragments.

Moreover, this provides that the fingers are not moved up and down transversely to the conveying face by the polygon effect, or prevents the formation, caused by the polygon effect, of an opening and closing gap under the fingers. The polygon effect occurs when because of the stiffness of the individual modules, the conveyor mat at the location of the divert wheel deforms into a polygon. Upon rotation, this polygon has a radius which, relative to the fingers, increases and decreases each time.

In another embodiment, the conveyor mat according to the invention is characterized in that transversely to the conveying direction, the section of the at least one groove is greater adjacent the front and/or rear side of the module than adjacent the center of the module. It is thus provided that the entry of a finger cooperating with the groove is facilitated if the finger is slightly oblique and/or dirt or glass is present in the groove, independently of the back or forth movement of the module in conveying direction.

In a next embodiment, the conveyor mat according to the invention is characterized in that at least a part of the base of the at least one groove is curved with a radius such that when the conveyor mat travels around a divert wheel, the slot at that location substantially forms a circular arc with the axis of the divert wheel as center. It is thus provided that during that travel, when the modules are being swiveled, a blending base can be formed more quickly, whereby the chance of glass fragments getting stuck between the fingers and the base of the modules can be further reduced.

In another embodiment, the conveyor mat according to the invention is characterized in that the through openings, viewed in a plane parallel to the conveying face, have rectangular, ellipsoidal, oval or round sections. It is thus provided that water, dirt and glass grit can effectively be discharged through the openings.

In yet another embodiment, the conveyor mat according to the invention is characterized in that the through openings are provided in the base of the at least one groove. It is thus provided that water, dirt and glass grit can flow away from the bottom through the openings in the groove.

In a next embodiment, the conveyor mat according to the invention is characterized in that the through openings are at least provided in a part of the top face located next to the at least one groove. It is thus provided that water, dirt and glass grit can be discharged from the flat top side of the module.

In another embodiment, the conveyor mat according to the invention is characterized in that the module is at its front and rear side provided with an equal number of hinge loops, which hinge loops, in a direction transverse to the conveying direction, are spaced apart a distance which is substantially equal to the width of a hinge loop, so that the hinge loops at the front and rear side of the module are staggered relative to each other by the width of one hinge loop. It is thus provided that during shortening of the conveyor mat, minimally only one row of modules has to be removed. This is in particular advantageous when the conveyor mat forms an endless loop and sagging of the conveyor mat on the return side has to be avoided, as in a conveyor mat forming a second or following floor in a pasteurizer.

In yet another embodiment, the conveyor mat according to the invention is characterized in that the hinge loops each have a fillet touching the top face of the modules horizontally, with a radius of a constant magnitude, extending outwards from the center line of the hinge pins, parallel to the conveying direction, and that the spaces between the hinge loops are provided with a recess shaped to correspond with the fillet. It is thus provided that the spaces between the hinge loops cover the hinge loops of a next module, which results in a flat conveying face at the location of the coupling of the rows of modules. Because of the constant radius, it is moreover provided that the gap between the successive modules remains constant also when the conveyor mat bends at the location of the divert wheels, as a result of which glass fragments and glass grit do not get stuck during bending of the conveyor mat. This reduces the chance of damage to the modules.

In a further embodiment, the conveyor mat according to the invention is characterized in that the hinge loops each comprise a hinge hole for receiving a hinge pin, the center line of the hinge hole being located at less than half the height of the module. It is thus provided that when glass fragments fall onto the subjacent return side of an endless conveyor belt, the chance of these glass fragments getting stuck in the space between the modules during bending of the conveyor mat at the location of the return wheel is reduced.

In a further embodiment, the conveyor mat according to the invention is characterized in that the modules each have their bottom sides provided with at least one chamber for receiving the teeth of the sprocket wheel, which chamber interconnects two opposite hinge loops and, in a direction transverse to the conveying direction, is located between two hinge loops. It is thus provided that the modules are provided with a large drive chamber, so that the chance of glass fragments getting stuck therein is small, while the module in longitudinal direction is sufficiently stiff and can be mounted on a sprocket wheel in two directions.

In a further embodiment, the conveyor mat according to the invention is characterized in that the chamber, viewed from the bottom side of the module, is substantially Z-shaped, the legs of the Z each being located adjacent a hinge loop and forming a curved surface along which a tooth of a sprocket wheel can be rolled. It is thus provided that the module can be driven in two directions.

In another embodiment, the conveyor mat according to the invention is characterized in that the modules each have their bottom sides provided with stiffening partitions extending in conveying direction. This increases the stiffness in longitudinal direction of the modules.

In a further embodiment, the conveyor mat according to the invention is characterized in that the module is manufactured from glass-filled plastic, in particular glass-filled polypropylene. It is thus provided that stretch of the module is reduced. Surprisingly, through the use of glass-filled polypropylene, a sufficiently tough and creep-resistant module is produced by means of a relatively cheap material. Preferably, the plastic of the module is filled with a glass filling of at least 30% by volume of glass fibers and/or glass globules.

The conveying system according to the invention is characterized in that the modules each comprise a substantially flat top face in which at least one groove extending in conveying direction is provided, which at least one groove has two sidewalls connected via a base, and that successive modules cooperate in such a manner that the top faces constitute a substantially flat conveying face and that the grooves together form at least one substantially straight slot that extends in conveying direction over the length of the conveyor mat in the conveying face and has substantially blending sidewalls for cooperation with a finger of the slide-over device.

Further advantages of the conveyor mat and the conveying system are described in the subclaims.

BRIEF DESCRIPTION OF THE DRAWINGS

The invention will be further explained with reference to an exemplary embodiment shown in a drawing. In the drawings:

FIG. 10 shows a schematic cross section corresponding to FIG. 8 of the travel of a conveyor mat at successive angular positions.

DETAILED DESCRIPTION

Figure 1:
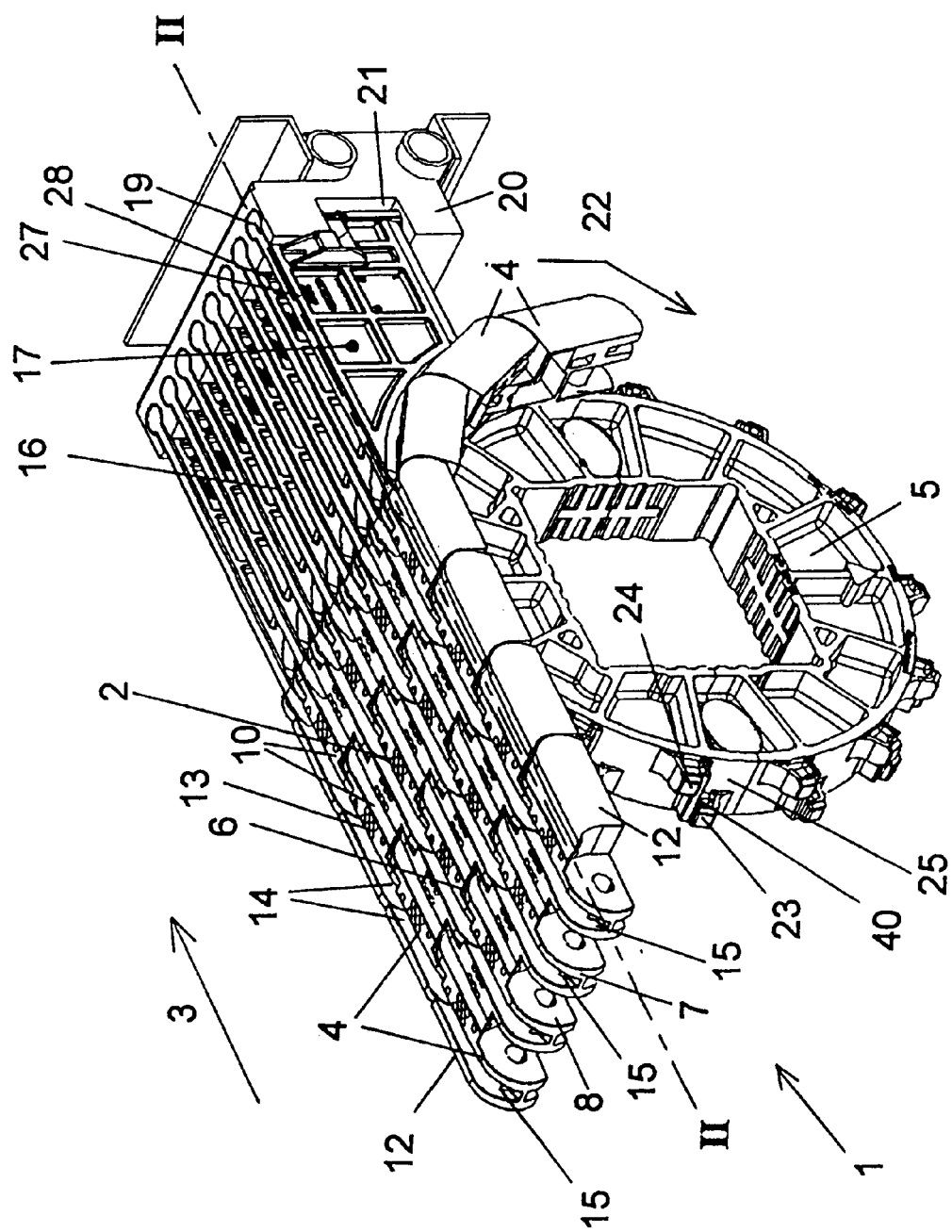
FIG. 1 is a schematic perspective drawing of a part of a conveying system according to the invention.

The Figures are schematic representations of a preferred embodiment of the invention and only serve as illustrations. In the Figures, identical or corresponding parts are designated by identical reference numerals.

Figure 2:
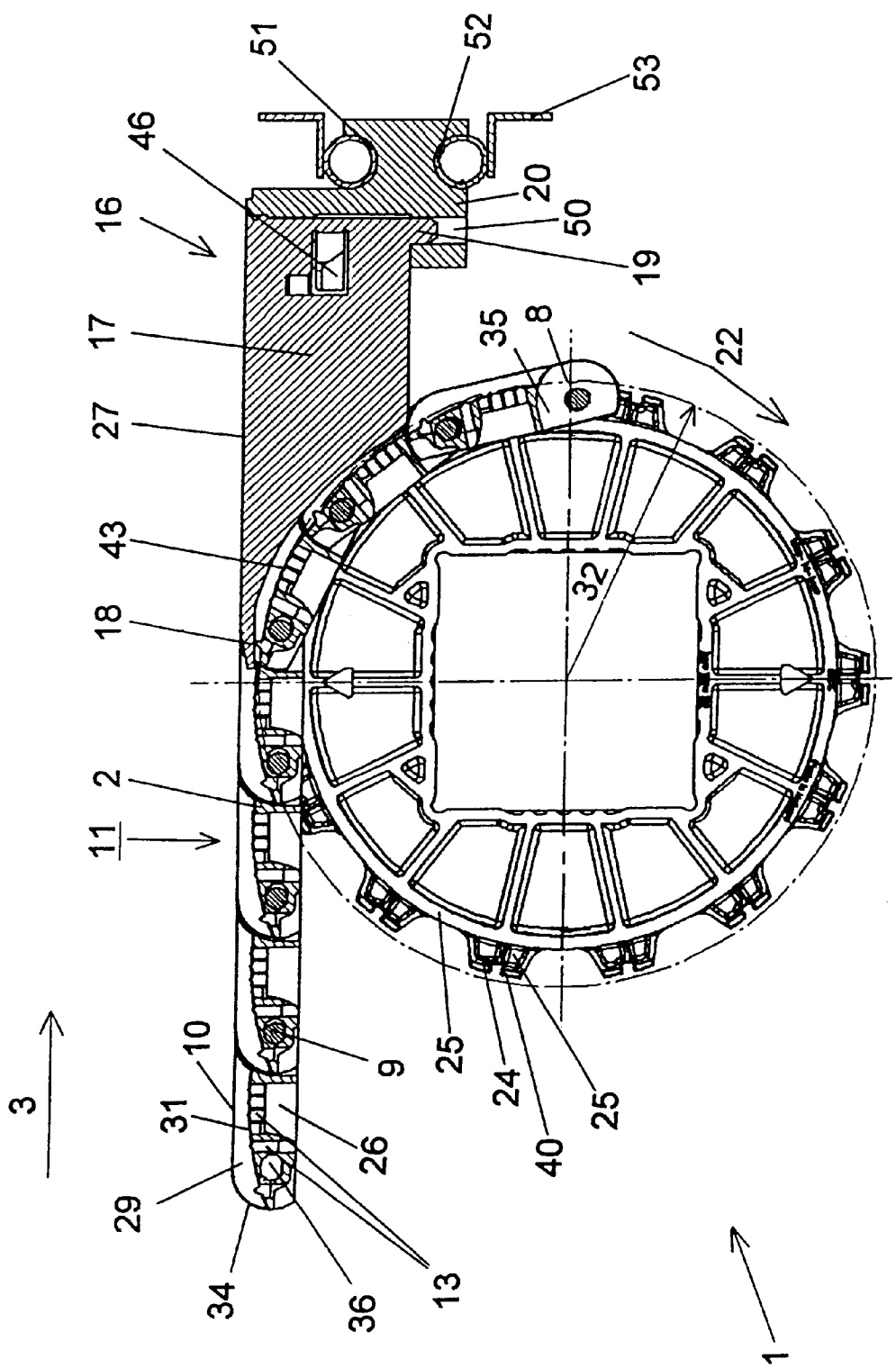
FIG. 2 shows a cross section of FIG. 1 along the line II—II.

Referring to FIGS. 1 and 2, a detail of the conveying system 1 according to the invention is shown therein. The conveying system 1 comprises an endless conveyor mat 2 traveling around two divert wheels. In FIGS. 1 and 2, only a part of the conveyor mat 2 is visible, adjacent the "end" of the conveyor mat 2 at the location where the conveyor mat 2 travels around a divert wheel 5. The conveyor mat 2 comprises a number of rows of plastic modules 4, succeeding each other in a conveying direction 3 and extending transversely to the conveying direction. In FIG. 1, of each row, only one module 4 is shown. In conveying direction, the modules 4 each have a front side 6 and a rear side 7. At their front and rear side 6, 7, the modules 4 are each provided with hinge loops 8. The hinge loops 8 of modules 4 succeeding each other in conveying direction 3 cooperate and are coupled by means of hinge pins 9 extending transversely to the conveying direction 3. The hinge pins 9 extend transversely to the conveying direction 3 throughout the width of the conveyor mat 4 and are preferably manufactured from plastic. The top faces 10 of the modules together constitute a conveying face 11.

Preferably, the conveyor mat 2 is built up from rows of modules 4 whose lateral sides 12 abut against each other, while the modules 4 of rows that succeed each other in conveying direction 3 are staggered relative to each other, as in a brickstone pattern. The modules 4 are each provided with through openings 13 extending substantially transversely to the conveying face 11. It is observed that "openings 13 extending substantially transversely to the conveying face 11" should also be understood to include openings extending obliquely from the top face 10 to the bottom side 37 of the module 4. The modules 4 have a substantially flat top face 10 in which grooves 14 extending in conveying direction 3 are provided. The modules 4 are coupled in such a manner that the conveying face 11 is substantially flat and comprises a number of substantially straight slots 15 which extend in conveying direction 3 over the length of the conveyor mat 2 and which have substantially blending sidewalls, formed by the blending sidewalls 29, 30 of the grooves 14 of successive modules 4.

The conveying system 1 further comprises a slide-over device 16 arranged adjacent the divert wheel 5, for transferring, from the conveying face 11, products which are conveyed by the conveyor mat 2 in the conveying direction 3 to the divert wheel 5. The slide-over device 16 comprises a number of substantially flat support bodies 17, each carrying a finger 18 at one end thereof and comprising, at an opposite end, a cylindrical fastening member 19. By means of their fastening members 19, the support bodies 17 are attached in fastening openings 21 in the mounting block 20 in such a manner that their respective fingers 18 each cooperate with one of the slots 15, while between the support bodies 17, an interspace 28 is present.

The operation of the conveying system is as follows. Products placed on the conveying face 11 of the conveyor mat 2 are displaced in the conveying direction 3 by driving the divert wheel 5 in the direction of the arrow 22. As a result, the projections 23, 24 provided on the outer circumference 25 of the divert wheel 5 engage the modules 4 in the chambers 26. At the location of the divert wheel 5, the modules 4 of the conveyor mat 2 first follow the outer circumference 25 of the divert wheel 5 over about 180° and subsequently follow the return side of their endless path. At the divert wheel 5, the products are transferred away from the conveying face 11, via the slide-over device 16. Indeed, at the location of the divert wheel 5, the fingers 18 of the slide-over device 16 project into the slots 15, preferably to a position above or beyond the center line of the divert wheel 5, causing the products which lead in conveying direction 3 to be transferred from the conveying face 11 by the following products, and to be pushed thereby, via the fingers 18, onto the top side 27 of the support bodies 17, in the direction of the mounting block 20. Next, the products are further discharged in a generally known manner.

The products can be placed on the conveying face 11 by means of a slide-over device 17 arranged adjacent the first divert wheel (not shown), of which slide-over device the fingers 18 project in conveying direction 3 into the slots 15. To that end, the products are transferred, by products that follow in conveying direction, over the top sides 27 of the support bodies 17 and via the fingers 18, to the conveying face 11, while dirt, etc. falls into the spaces 28 between the support bodies 17.

When the products are glass bottles and when the system 1 is used as conveying track in a pasteurizer as described hereinabove, a number of bottles will break during transport and because of the shape of the modules 2, glass fragments and large pieces of dirt will accumulate on the conveyor belt. The through openings 13 of the modules 4 enable water, smaller parts of dirt and glass grit to be discharged from the conveying face 11 through the modules 4 during transport. Glass fragments and larger parts of dirt are removed from the conveying face by the fingers 18 and fall down via the spaces 28 between the support bodies 17. Should the open spaces 28 between the support bodies 17 become clogged, this is directly perceptible to an observer, so that the open spaces can be cleaned in time. When a finger 18 or a support body 17 is damaged or bends, for instance because of a glass fragment stuck in the conveying face 11, this is likewise directly perceptible. A support body 17 whose finger 18 is damaged or which itself is damaged, can be replaced as a loose unit by removing the support body 17 from the mounting block 20 in a manner which will be explained in more detail in the discussion of the mounting block 20.

Since the sidewalls 29, 30 of the grooves 14 in successive modules 4 connect to form slots 15 having blending sidewalls, fragments and the like can easily be removed by means of the fingers 18 and the risk of jamming is small. Further, because the grooves are connected via a base 31, the chance of glass fragments and the like getting stuck is even further reduced.

Because also the bases 31 of the grooves 14 are curved in conveying direction such that when they travel around, they substantially blend, the risk of damage to the fingers caused by glass fragments that, during travel, get stuck between the bases 31 and the fingers 18, is also small.

Referring to FIGS. 3–6, different parts of the conveying system will be discussed in more detail.

Figure 3:
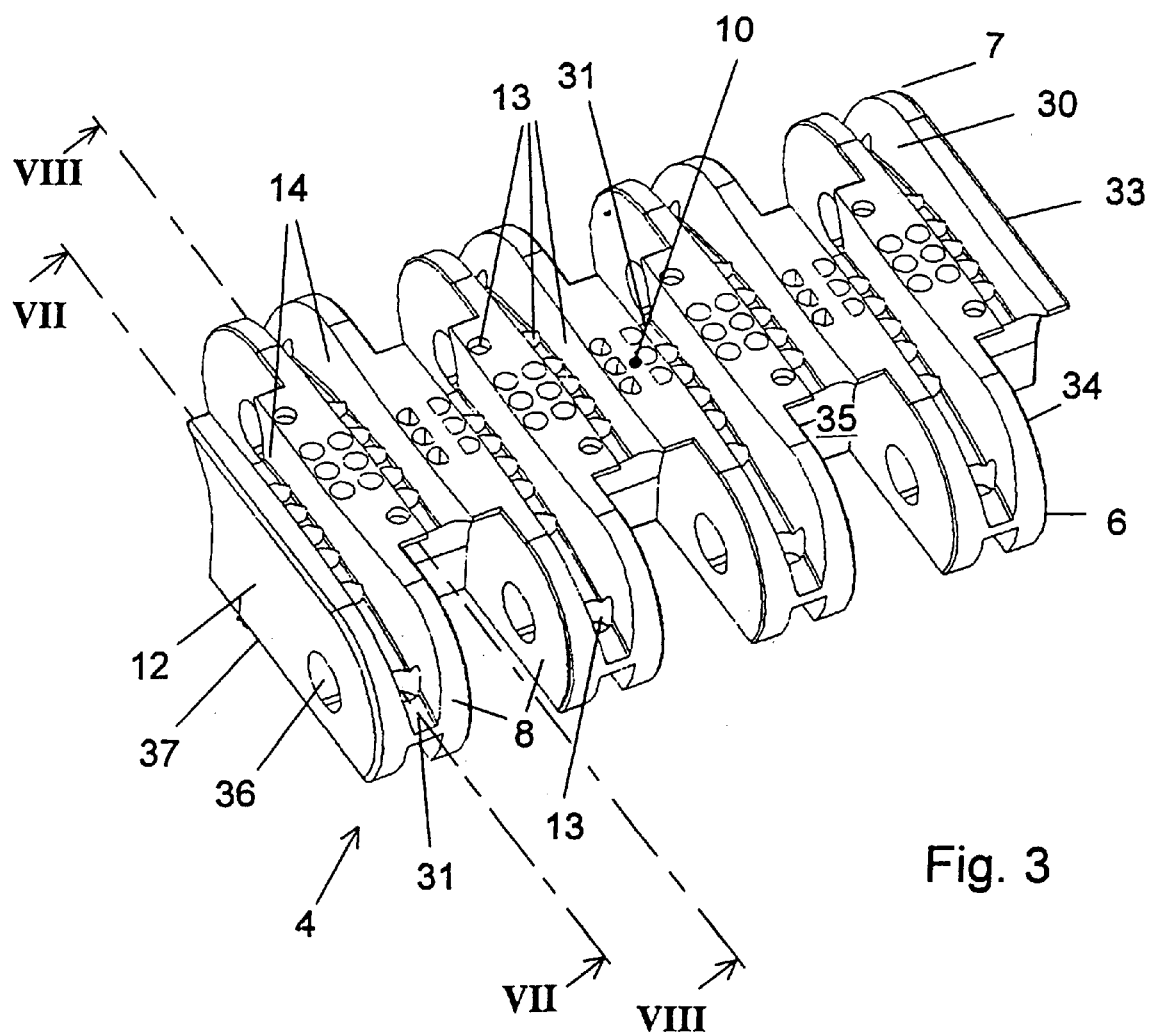
FIG. 3 is a schematic perspective drawing of a module of the conveyor mat of the conveying system of FIG. 1, viewed from the top.
Figure 4:
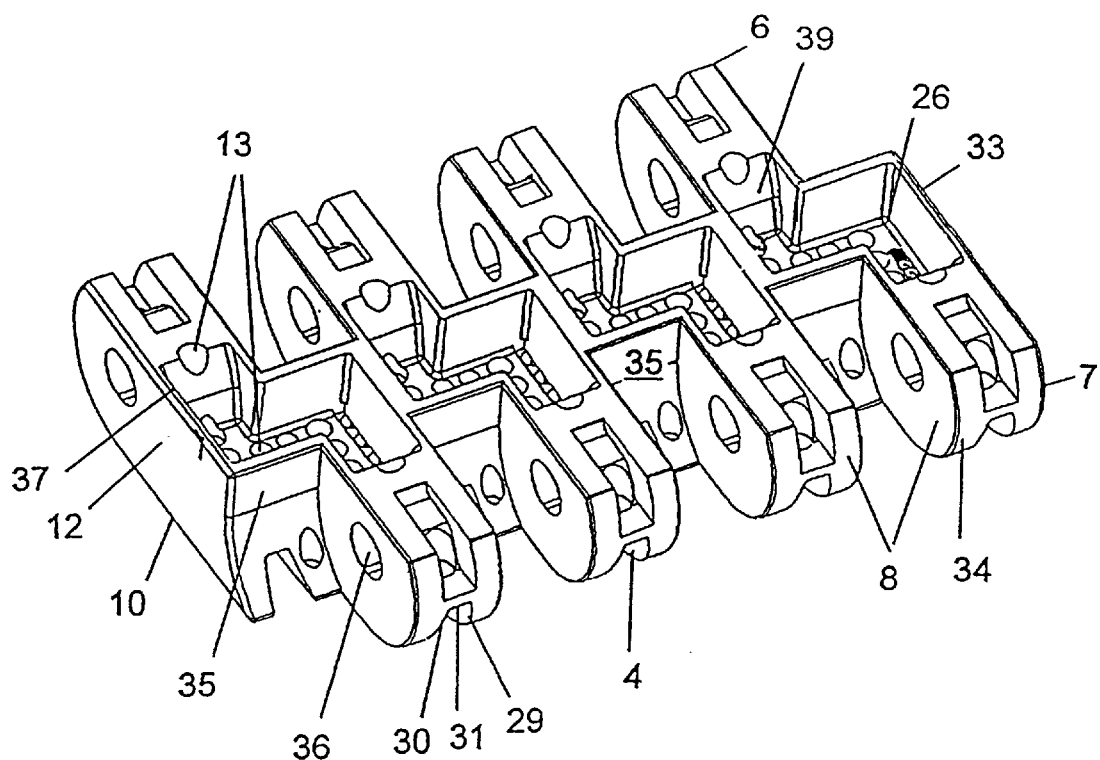
FIG. 4 is a schematic perspective drawing of a module of the conveyor mat of the conveying system of FIG. 1, viewed from the bottom.

Referring to FIGS. 3 and 4, a module 4 is shown therein. The top face 10 of the module 4 is substantially flat, allowing products to stand in a stable manner on the parts of the top face which are located between the grooves 14. The grooves 14 each have two sidewalls 29, 30 which are connected via a base 31, so that the chance of fragments falling through the module 4 is reduced. Transversely to the conveying direction, the grooves 4 have a trapezoidal section, which facilitates the cooperation with a finger 18. The base 31 of the grooves 14 is at least partially curved with a radius 32 such that when the conveyor mat 2 travels around a divert wheel 5, the slot 15 at that location substantially forms a circular arc with the axis of the divert wheel 5 as center (FIG. 2). This prevents the flow of water in longitudinal direction of the slot 15 and prevents the fingers 18 from moving up and down relative to the conveying face 11 as a consequence of the above-described polygon effect, and/or prevents the formation of an opening and closing gap between the fingers 18 and the slot 15.

The section of the grooves 14 transverse to the conveying direction 3 adjacent the front side 6 and the rear side 7 of the module 4 is greater than adjacent the center 33 of the module 4, to facilitate the insertion of the finger 18 into the groove 14. The through openings 13 are designed as round holes provided both in the top face 10 of the module 4 and in the base 31 of the grooves 14 provided in the top face 10.

In a direction parallel to the conveying face, the through openings 13 have a greatest dimension of less than 15 mm, preferably less than 10 mm, in particular less than 7 mm. It is thus provided that the chance of glass fragments getting stuck in the through openings is reduced.

The module 4 has its front side 6 and rear side 7 provided with an equal number of hinge loops 8. In a direction transverse to the conveying direction 3, the hinge loops 8 are spaced apart a distance which is substantially equal to the width of a hinge loop 9, and at the front side 6 and rear side 7 of the module 4 they are staggered relative to each other by the width of one hinge loop. Consequently, particularly the shortening of the conveyor mat requires the removal of minimally only one row of modules 4. It is observed that modules 4 whose hinge loops 8 are not staggered relative to each other and/or which have an unequal number of hinge loops 8 at the front side 6 and the rear side 7, are also possible within the framework of the claims.

The hinge loops 8 are each provided with a fillet 34 touching the top face 10 of the module horizontally, with a radius of a constant magnitude, extending outwards from the center line of the hinge pins 9, parallel to the conveying direction 3, while the spaces between the hinge loops 8 are provided with a recess 35 shaped to correspond with the fillet 34. Thus, the conveyor mat 2 also has a flat conveying face 11 at the location of the transitions between the rows of modules 4. Moreover, during the bending of the conveyor mat 2, glass grit from the top side 10 is prevented from getting stuck in the space between the modules 4. The hinge loops 8 of the modules 4 each have a hinge hole 36 for accommodating a hinge pin 9. By giving the hinge hole 36 an elongated design, the assembly and disassembly of the hinge pins 9, inter alia, can be carried out in a simpler manner. The center lines of the hinge holes 36 are located at less than half the height of the module 4, i.e. closer to the bottom side 37 than to the top face 10, to prevent the action of glass grit from the bottom side.

Figure 5:
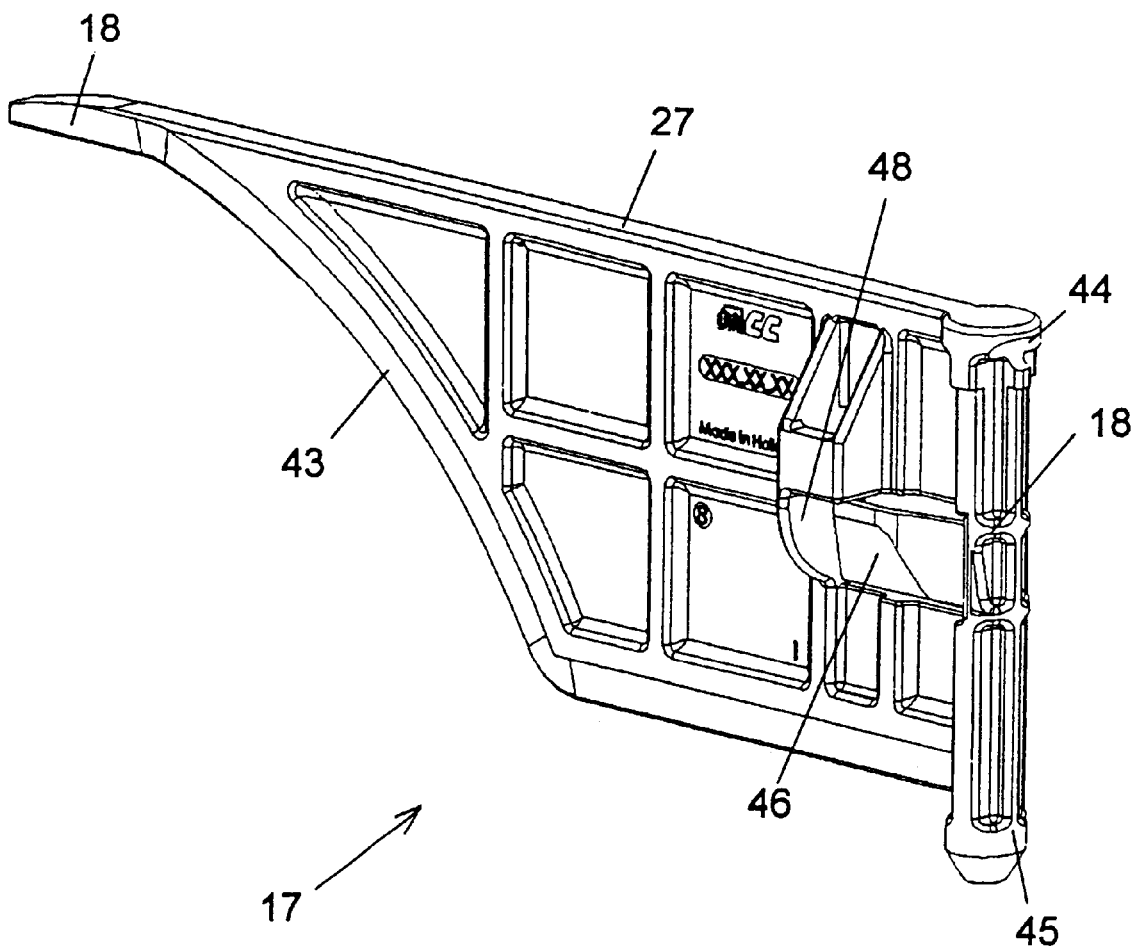
FIG. 5 is a schematic perspective drawing of a support body of the conveying system of FIG. 1.

Referring to FIG. 5, a support body 17 is shown therein, carrying a finger 18. The support body 17 is preferably manufactured from plastic. At its opposite side, the support body 17 comprises a fastening member 19. The support body 17 comprises a curved side 43 cooperating with the curvature of the slot 15 in the conveyor mat 2 at the location of the divert wheel 5 (FIG. 2). Preferably, the section of the finger 18 and the curved side 43 transverse to the conveying direction 3 is designed to correspond to the groove 14, and is in particular trapezoidal, so that the finger 18 and the curved side 43 protect the slot 15 against the intrusion of glass. The support body 17 has a flat top side 27 for transferring products from the conveying face 11 in the direction of the mounting block 20. The fastening member 19 has at its top side 44 a greater diameter than at the bottom side 45, which will be discussed in more detail in the discussion of the mounting block. The support body 17 further comprises a snap finger 46 for cooperation with a corresponding recess 47 in the mounting block 20. The snap finger 46 comprises a cover 48 which protects the snap finger 46 from glass fragments and the like falling thereon, and which enables blocking the snap finger 46 in a depressed condition with a screw driver so as to facilitate the assembly/disassembly of the support body 17 on the mounting block 20.

Figure 6:
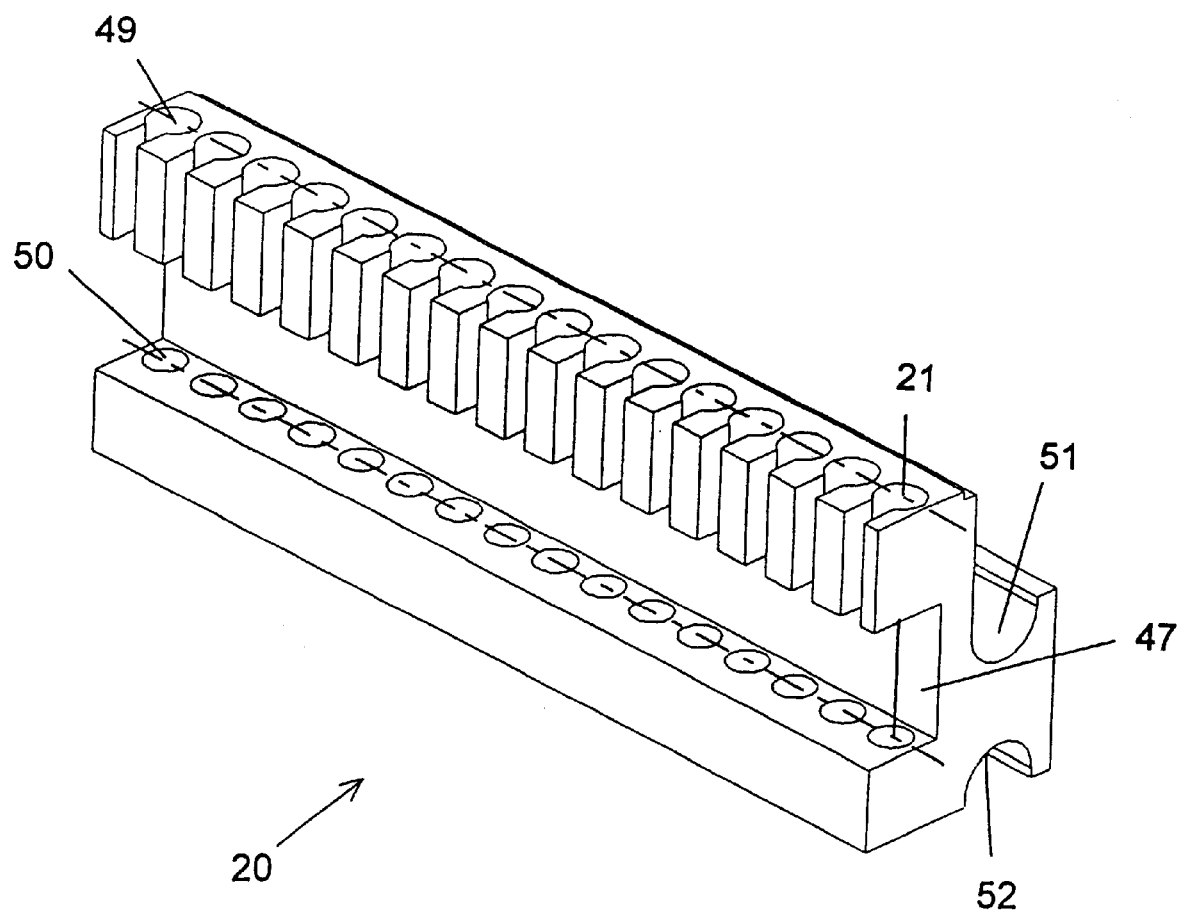
FIG. 6 is a schematic perspective drawing of a mounting block of the conveying system of FIG. 1.

Referring to FIG. 6, a mounting block 20 is shown therein, having a number of parallel fastening openings 21 spaced apart in transverse direction of the mounting block 20, comprising an upper row of holes 49 whose diameter is stepped from large to small over the longitudinal direction thereof, a recess 47 and a lower row of holes 50. In the case of a wide conveyor mat 2, a number of mounting blocks 20 are placed side by side, transverse to the conveying direction 3. The mounting block 20 is preferably manufactured from plastic. During the assembly of a support body 17 in the mounting block 20, the snap finger 46 of that support body 17 is first fixed in a folded-in position by passing a bar, such as a screw driver, between the snap finger 46 and the cover 48. Next, the fastening member 19 is passed through one of the holes of the upper row of holes 49, until the bottom side 45 of the fastening member 19 is located in a corresponding hole of the lower row of holes 50. Upon removal of the screw driver, the snap finger 46 rebounds to lock the fastening member 19 through cooperation with the recess 47. Disassembly proceeds in the reverse order.

It is also possible to provide the snap finger 46 with a bevel whereby, during insertion, the snap finger is folded in through contact with an edge of the mounting block 20. In that case, the use of a bar during assembly is not necessary.

After assembly of the support bodies 17 to the block 20, the support bodies 17 extend substantially parallel with mutual interspaces 28, and they each have their finger 28 projecting from the slide-over device 16 into a slot 15, against the conveying direction 3.

By giving the upper part 44 of the fastening member 19 a larger diameter than the lower part 45, it is provided that the upper part of the fastening member 19 contains sufficient material to take up forces in the conveying direction 3. By designing the upper row of holes 49 so that in mounting direction, they have a decreasing, preferably stepped, diameter, the material in transverse direction of the mounting block 20 between the holes 49, 50 moreover has sufficient strength to enable shortening the mounting block 20 in transverse direction between the holes 49, 50. In that case, the material next to a hole 49 adjacent the edge is sufficiently firm to support the support body 17 without bending outwards, which is not the case if the diameter is large throughout the length of the holes 49.

The mounting block 20 is further provided with two opposite slots 51, 52, extending transversely to the conveying direction 3, whereby the mounting block 20 can be mounted on a frame 53. Due to the temperature in the pasteurizer, the conveyor mat 2 will expand, for instance by 10 mm per meter at a temperature rise of 60° C. The slots 51, 52 have the advantage that upon expansion of the conveyor mat 2, the mounting block 20 can slide transversely to the conveying direction 3. The slots 51, 52 also permit expansion of the mounting block 20 relative to the frame 53, due to heating, without warping of the mounting block 20. In addition, through the use of the slots 51, 52, play of the conveyor mat 2 transverse to the conveying direction 3 due to small differences in the width of the hinge loops 8 and the space between the hinge loops of a module 4, can be taken up as well.

Figure 7:
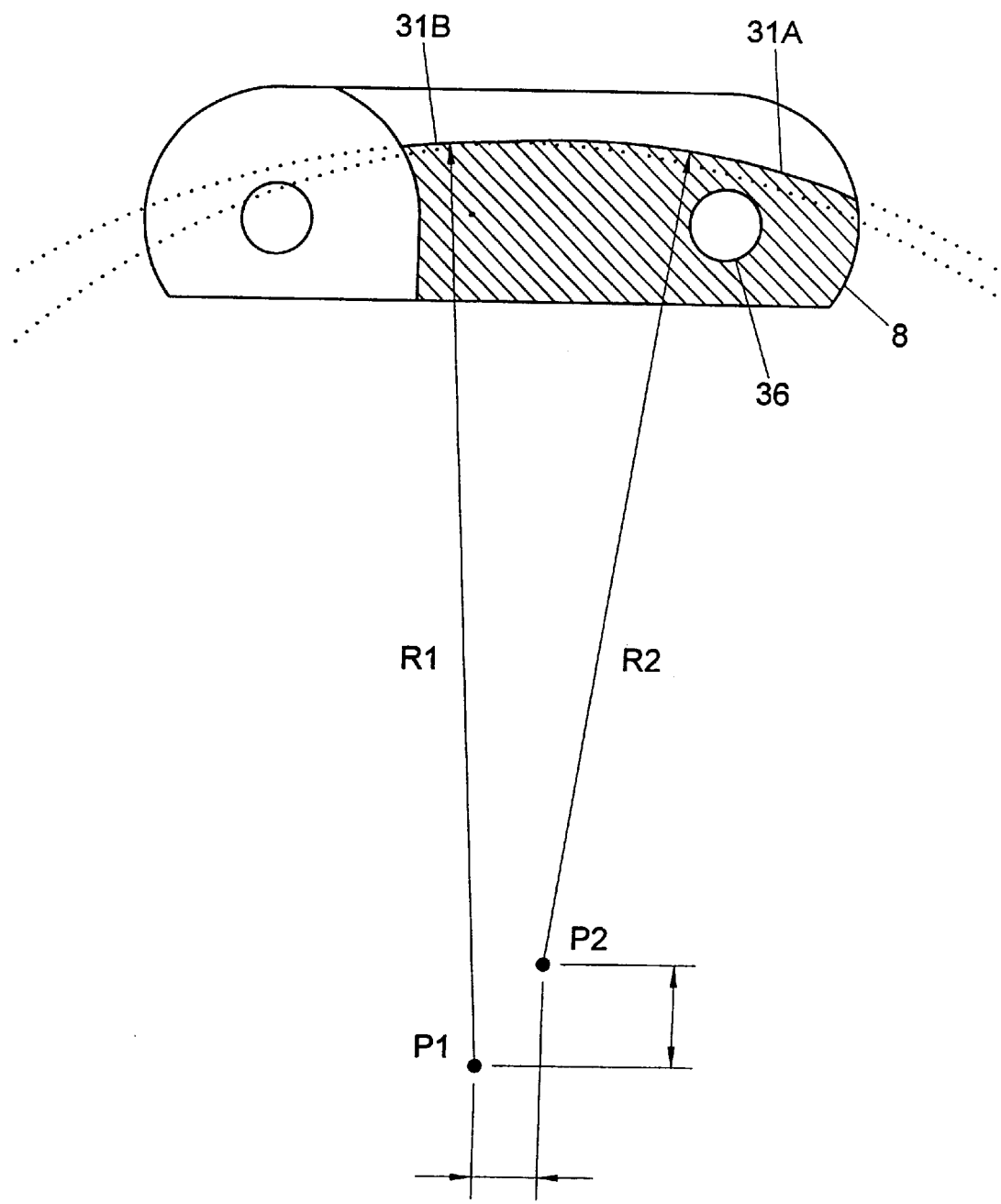
FIG. 7 shows a section of the module of FIG. 3 along the line VII—VII.
Figure 8:
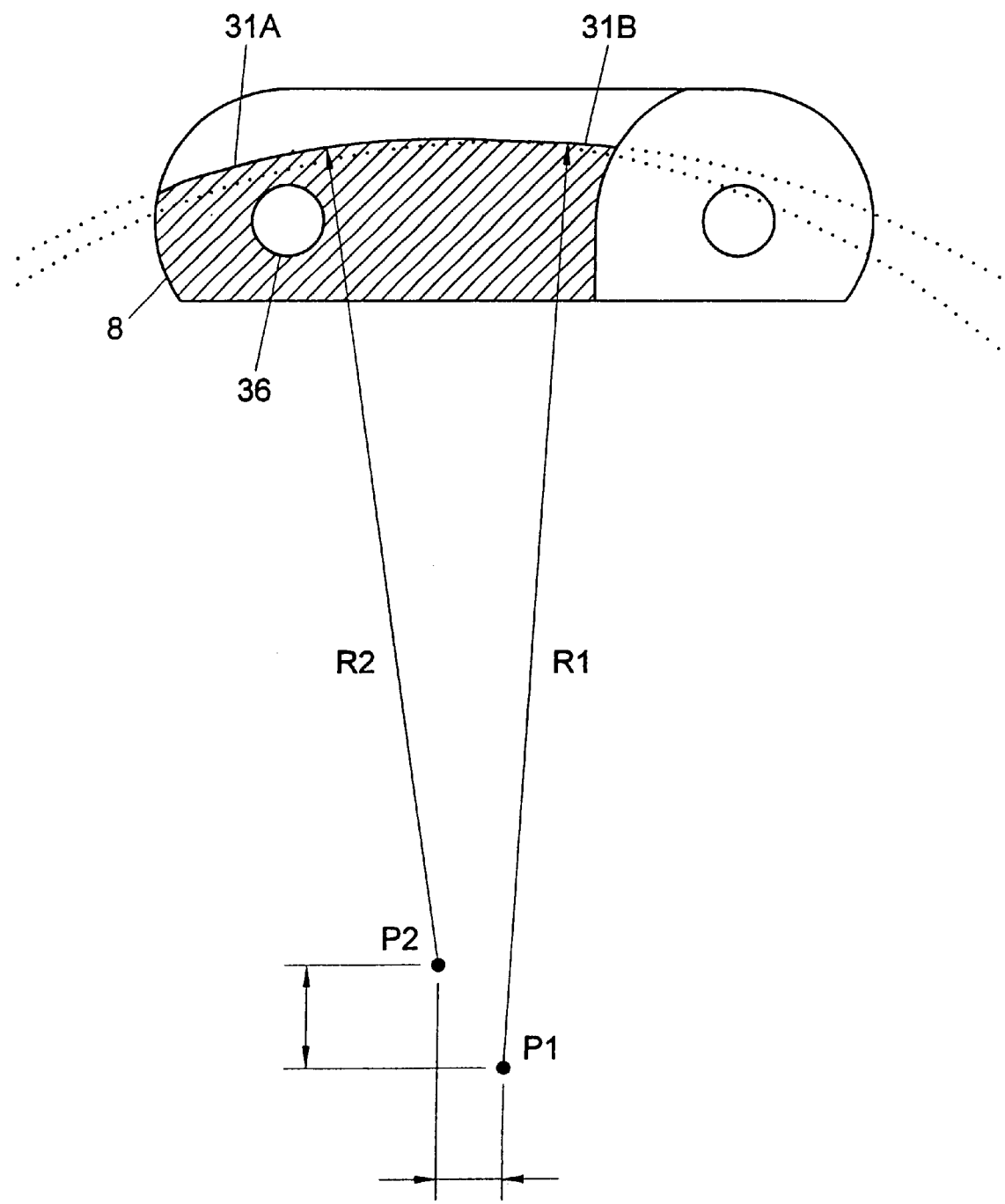
FIG. 8 shows a section of the module of FIG. 3 along the line VIII—VIII in FIG. 3.

Referring to FIGS. 7 and 8, it is shown therein that a part 31A of the base 31 extending over the hinge loop 8 is curved with a radius of curvature R2 which, compared with the radius of curvature R1 of a further part of the base 31B, is smaller and has a center of curvature P2 which is located closer to the hinge hole 36 of the hinge loop 8 than the center of curvature P1 of the other part 31B of the base 31. Preferably, the parts 31A, 31B of the base substantially blend with respect to each other. It is observed that the base 31 may comprise a plurality of curved parts.

Figure 9:
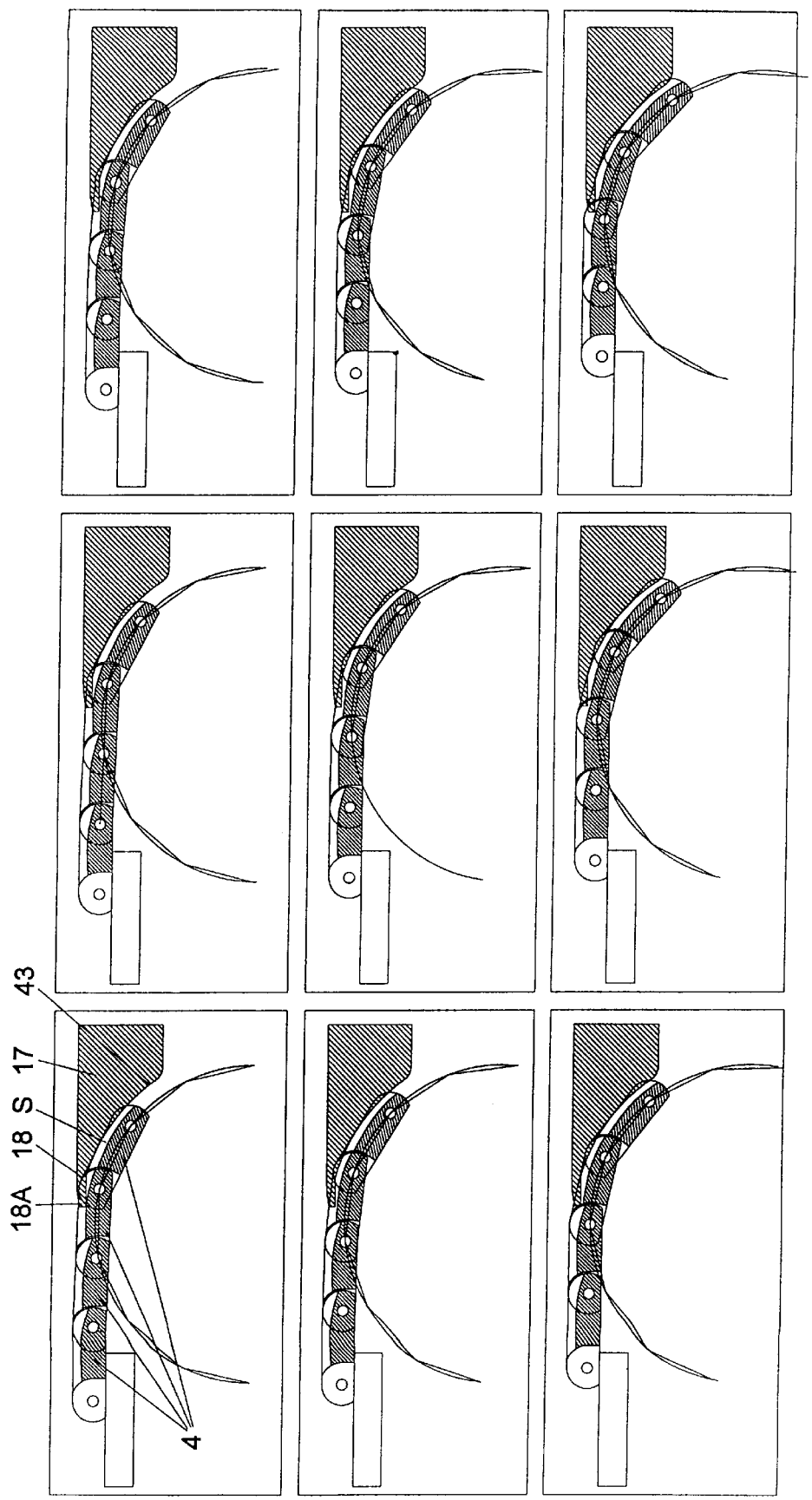
FIG. 9 shows a schematic cross section corresponding to FIG. 7 of the travel of a conveyor mat at successive angular positions.

Referring to FIGS. 9 and 10, it is shown therein that when the conveyor mat 2 travels around the divert wheel 5, during the swiveling of the modules 4, a blending base 31 can be formed relatively quickly through the use of the part 31B that is curved more strongly, as a result of which the change of damage to the finger 18 caused by glass fragments stuck between the successive modules 4 and the finger 18 can be reduced. In an advantageous manner, the support body 17 and/or the fingers 18 are provided with an edge 43 curved such that during traveling around, a widening gap S is formed between the base 31 and the finger 18. This permits fragments that have slipped under a first part 18A of the finger 18 to travel around along with a slight chance of damage, and to be subsequently discharged.

It is observed that the exemplary embodiment only concerns a preferred embodiment and that within the framework of the following claims, a great number of other embodiments are possible.

What is claimed is:

1. A conveyor mat for conveying breakable products in a conveying direction and extending between two divert wheels spaced apart by a predefined distance, said mat comprising:
    a plurality of adjacently disposed plastic modules, each having a conveying face and through openings extending substantially transversely to said conveying face and each having a front side provided with front hinge loops and a rear side provided with rear hinge loops;
    a plurality of hinge pins, each extending through said front hinge loops of one of said modules and through rear hinge loops of an adjacently disposed one of said modules;
    each of said modules further comprising a substantially flat top surface and at least one groove in said top surface, said groove having opposing sidewalls interconnected by a base and extending in said conveying direction, said groove in each of said plurality of modules being disposed in alignment with said groove of each adjacent module to form a substantially continuously extending straight slot having smoothly extending side walls over said predefined distance.

2. The conveyor mat in accordance with claim 1 wherein each of said hinge loops has at most one groove.

3. The conveyor mat in accordance with claim 2 wherein said at least one groove has a substantially rectangular cross-section in said conveying direction and widening toward said top face.

4. The conveyor mat in accordance with claim 1 wherein said at least one groove is provided with a base and said base is curved in said conveying direction, whereby bases of successive modules are in substantial alignment as successive modules travel around said divert wheels.

5. A conveyor mat in accordance with claim 4 wherein said divert wheels and have an axis of rotation and a part of said base of said at least one groove is curved with a radius such that when said conveyor mat travels around a divert wheel, said slot forms a substantially circular arc having an axis of rotation coinciding with said axis of said divert wheel.

6. A conveyor mat in accordance with claim 2 wherein said base comprises a first part having a pre-defined radius of curvature and a center of curvature spaced apart from said hinge hole and a second part having a radius of curvature smaller than said radius of curvature of said first part and wherein said second part has a center of curvature located closer to said hinge hole than center of curvature of said first part.

7. The conveyor mat in accordance with claim 1 wherein each of said hinge loops has a fillet having a radius of a substantially constant magnitude and disposed in a touching relationship with said top face of said modules horizontally and extending outwardly from said centerline of said hinge pins in a direction parallel to said conveying direction, wherein said fillets have a pre-defined shape and said hinge loops are provided with a recess shape to correspond to said pre-defined shape.

8. A conveyor mat in accordance with claim 1 wherein said hinge loops each comprise a hinge hole for accommodating a hinge pin, said module having a pre-defined height and said hinge pin having a centerline disposed at less than one-half of said predefined height of said module.

9. A conveyor mat in accordance with claim 1 wherein, in a direction transversely to the conveying direction, a cross-section of said at least one groove is greater adjacent said front and said rear sides of said module than adjacent said center of said module.

10. A conveyor mat in accordance with claim 1 wherein said base of said at least one groove comprises flow-blocking means.

11. The conveyor in accordance with claim 1 wherein said through openings, viewed in a plane parallel to said conveying face have a round cross-section.

12. A conveyor mat in accordance with claim 1 wherein said through openings are provided in said base of said at least one groove.

13. The conveyor mat in accordance with claim 1 wherein said through openings are provided in a part of said top face disposed adjacent said at least one groove.

14. The conveyor mat in accordance with claim 1 wherein said module has front and rear sides, each provided with an equal number of hinge loops, said hinge loops having a pre-defined width and wherein said hinge loops are spaced apart, in a direction transverse to the conveying direction, by a distance substantially equal to the width of a hinge loop and wherein said hinge loops at said front and said rear sides of said module are staggered relative to each other by a distance equal to the width of said hinge loops.

15. The conveyor mat in accordance with claim 1 wherein each of said modules has a bottom side provided with at least one chamber for receiving teeth of a sprocket wheel, said chamber interconnecting two opposite hinge loops and disposed between two hinge loops in a direction transverse to said conveying direction.

16. The conveyor mat in accordance with claim 6 wherein said chamber has a bottom side and wherein said chamber viewed from said bottom side is substantially z-shaped and opposing sides of said z-shaped chamber are each located adjacent a hinge loop and form a curved surface for accommodating a tooth of a sprocket wheel.

17. A conveyor mat in accordance with claim 15 wherein said modules each have a bottom side and said bottom sides are provided with stiffening partitions extending in said conveying direction.

18. A conveyor mat in accordance with claim 1 wherein said modules are manufactured from glass-filled polypropylene.

19. A conveying system comprising:
    a pair of divert wheels spaced apart by a predefined distance;
    an endless conveyor mat extending between said divert wheels for conveying products in a conveying direction;
    said conveyor mat comprising a plurality of plastic modules arranged to succeed each other in said conveying direction and extending transversely to the conveying direction;

said modules each having a front side provided with front hinge loops and a rear side provided with rear hinge loops;

a plurality of hinge pins extending through said hinge loops in a direction transverse to the conveying direction;

said modules each having a top face and said top faces of said plurality of modules together constituting a conveying face, said modules each being provided with through openings extending transversely through said conveying face;

said conveying system further comprising a slide-over device comprising at least one finger and disposed adjacent at least one of said divert wheels for transferring products conveyed by said conveyor mat toward said divert wheel;

said modules each comprising a substantially flat top face and at least one groove in said top face and extending in said conveying direction, said at least one groove having two side walls connected via a base;

said module arranged such that said top faces of successive modules constitute a substantially flat conveying face and said grooves together form at least one substantially straight slot extending in said conveying direction over said length of said conveyor mat, said straight slot having substantially smoothly extending side walls over said pre-defined distance for cooperation with said finger of said slide over device.

20. The conveying device in accordance with claim 19 wherein each of said hinge loops is provide with at most one groove.

21. The conveying system in accordance with claim 19 wherein said groove has a substantially rectangular cross-section and sloping sides widening said groove toward said top face.

22. The system in accordance with claim 19 wherein said base of said at least one groove is curved in said conveying direction, whereby bases of successive modules substantially blend during travel around said divert wheel.

23. A conveyor mat for conveying products in a conveying direction between at least two divert wheels, comprising a number of plastic modules succeeding each other in said conveying direction and extending transversely to said conveying direction, said modules each having a front side provided with front hinge loops and a rear side provided with rear hinge loops, said hinge loops of successive modules being coupled by hinge pins extending transversely to said conveying direction, said modules each comprising a substantial flat top face and at least one groove in said top face extending in said conveying direction, said at least one groove having two side walls connected via a base, said successive modules cooperating such that top faces of said successive modules constitute a substantially flat conveying face and said grooves together forming at least one substantially straight slot extending in said conveying direction over said length of said conveyor mat and having substantially blending side walls;

each of the modules having a bottom side and at least one chamber located between two hinge loops for receiving teeth of a sprocket wheel, said chamber interconnecting two opposite hinge loops in a direction transverse to said conveying direction, said chamber being substantially z-shaped and having opposite walls, said opposite walls of said chamber each located adjacent a hinge loop and forming a curved surface for engagement with a tooth of a sprocket wheel.

\* \* \* \* \*